United States Patent Office 3,647,753
Patented Mar. 7, 1972

3,647,753
ALTERNATING COPOLYMERS OF CONJUGATED COMPOUNDS AND UNSATURATED HYDROCARBON COMPOUNDS AND PROCESS FOR PRODUCTION THEREOF
Kohei Nakaguchi, Osaka, Shohachi Kawasumi, Kobe, Masaaki Hirooka, Ibaraki-shi, Hiroshi Yabuuchi, Takatsuki-shi, and Hiroyoshi Takao, Ashiya-shi, Japan, assignors to Sumitomo Chemical Company, Ltd., Osaka, Japan
No Drawing. Continuation of abandoned application Ser. No. 565,726, July 18, 1966. This application Oct. 15, 1969, Ser. No. 866,775
Claims priority, application Japan, July 22, 1965, 40/44,060; July 30, 1965, 40/46,495; July 2, 1966, 41/35,764
Int. Cl. C08f *3/40, 3/74, 9/00*
U.S. Cl. 260—63 R                    13 Claims

ABSTRACT OF THE DISCLOSURE

A compound having a C≡N or C=O group in the conjugated position relative to the C=C bond forms a complex with an organohalide of aluminum or boron. An alternating copolymer is obtained from a monomer satisfying said requirement and inner olefinic monomers or polymers or acetylenes having a donor property. In this case, an organoaluminum halide or an organoboron halide is suitable as the catalyst for said copolymerization. This type of active species can also be obtained by mixing an organic compound of a metal of Group II, III or IV of the Periodic Table with a halide of a metal of Group III or IV in the presence of the above-mentioned conjugated monomer.

---

This application is a streamlined continuation of our co-pending application Ser. No. 565,726 filed July 18, 1966 and now abandoned.

This invention relates to copolymers and substituted copolymers of conjugated compounds and unsaturated hydrocarbon compounds, and a process for the production of such copolymers. More particularly, the invention provides alternating copolymers of conjugated vinyl compounds, or substituted compounds thereof, having nitrile, carbonyl or thiocarbonyl groups at the conjugated positions of carbon-carbon double bonds and unsaturated hydrocarbon compounds, or substituted compounds thereof, selected from internal olefins, polyenes and acetylenes. The invention further provides a process for producing copolymers using said monomers.

The present inventors already provided alternating copolymers of conjugated vinyl compounds selected from acrylonitrile, acrylic acid derivatives and thioacrylic acid derivatives and olefinic unsaturated compounds or halogen-substituted olefinic unsaturated compounds, and a method for the production of copolymers by use of said monomers.

As the result of further studies, the present inventors have found the fact that the copolymerization reactions of this kind can be applied not only to terminal unsaturated olefinic compounds but also to various unsaturated compounds of internal olefins, polyenes and acetylenes and to the case where conjugated vinyl compounds have substituents, and have discovered a group of novel alternating copolymers.

The present invention provides an alternating copolymers of an unsaturated hydrocarbon compound, or a substituted compound thereof (monomers of the group [A]), selected from the group consisting of
(1) An internal olefinic compound having the formula

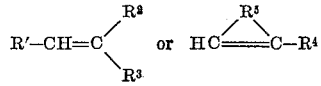

wherein R' and R² are respectively hydrocarbon radicals having 1 to 20 carbon atoms or halogen-containing hydrocarbon radicals having 1 to 20 carbon atoms; R³ and R⁴ are hydrogen atoms, hydrocarbon radicals having 1 to 20 carbon atoms or halogen-containing hydrocarbon radicals having 1 to 20 carbon atoms; and R⁵ is a cyclic hydrocarbon residue having 1 to 20 carbon atoms or a halogen-containing cyclic hydrocarbon residue having 1 to 20 carbon atoms, R¹ to R⁵ contain no polymerizable unsaturated linkages and may be derivative groups having other inert substituents;
(2) A polyene compound with up to 30 carbon atoms containing at least one carbon-carbon double bond having at least 2 hydrogen atoms; and
(3) An acetylene compound having the formula $$R^6C{\equiv}CR^7$$

wherein R⁶ is hydrogen atom, a hydrocarbon radical having 1 to 20 carbon atoms or a substituted radical thereof; and R⁷ is hydrogen atom, a hydrocarbon radical having 1 to 20 carbon atoms and containing polymerzable unsaturated group or a substituted radical thereof; and a conjugated compound (monomers of the group [B]) having the formula:

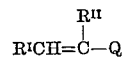

wherein R¹ and R¹¹ are respectively radicals having 1 to 20 carbon atoms, halogen-containing hydrocarbon radicals having 1 to 20 carbon atoms, halogen or hydrogen atoms, and at least one of R¹ and R¹¹ is hydrogen atom, including the case where R¹ and R¹¹ are derivative groups having other inert substituents; Q is a nitrile group or

group, where Y is a group selected from Z²H, Z²R, Z²Me, NR'R", R, a halogen atom and hydrogen atom, in which Z¹ and Z² are respectively oxygen or sulfur atoms; R is an organic radical having 1 to 20 carbon atoms; R' and R" are same or different groups selected from hydrogen atom and organic radicals having 1 to 20 carbon atoms, including the case where R' and R" are mutually bonded at other portion than nitrogen; and Me represents a monovalent portion of an element of Groups I to III of the Mendeleev's Periodic Table or an ammonium group.

Further the present invention provides a process for producing copolymers, which comprises contacting said unsaturated hydrocarbon compound or substituted compound thereof (monomers of group [A]) and said conjugated compound (monomers of group [B]) with (1) an organo-metal halide having the formula:

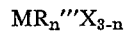

wherein M is aluminum or boron; R'" is an organic radical; X is a halogen atom; and n is an arbitrary number from 1 to 2, or a mixture of at least 2 compounds having the following formulas (A) $MR_n'''X_{3-n}$, (B) $M'R_3^{IV}$ and (C) $M''X_3'$ wherein M, M' and M" are aluminum or boron; R''' and $R^{IV}$ are organic radicals; X and X' are halogen atoms; and $n$ is an arbitrary number from 1 to 2, or with (2) catalyst component (a) an organo-compound of a metal of Group IIb, IIIb or IVb of the Mendeleev's Periodic Table and catalyst component (b) a halogeno-compound of a metal of Group IIIb or IVb of the Periodic Table, wherein at least one metal component of (a) and (b) is aluminum or boron, and (a) must be contacted with (b) in the presence of at least the conjugated compound (monomers of group [B]) of said monomers employed.

Still further the present invention provides a process for producing copolymers in which the above-mentioned copolymerization reaction is effected in the presence of oxygen or an organic peroxide, if necessary.

The alternating copolymers of the present invention have not yet been known. The conjugated compounds (monomers of group [B]) have been known, in general, as monomers having radical polymerizability, and radical polymerization using said monomers results in no other product than random copolymers. It is therefore quite unexpected that the conjugated compounds of this kind give alternating copolymers with the unsaturated hydrocarbon compounds (monomers of group [A]).

In order to obtain the alternating copolymers in accordance with the process of the present invention, the characteristics of catalyst components are of importance. The process of the present invention requires aluminum or boron as a metal component and further requires the presence of an organic group and a halogen in combination therewith. Other important characteristic is that the metal component coordinates with the conjugated compound. Particularly, the coordination with a halogen-containing metal component is of significance, and the copolymerization reaction proceeds through this kind of coordinated complex. The conjugated compound is required to be such that the polar group thereof is in the position conjugated with carbon-carbon double bond. This has a great significance in copolymerization reactivity.

In case of using the catalyst components of (a) an organo-compound of a metal from Groups IIb, IIIb and IVb of the Mendeleev's Periodic Table and (b) a halogeno-compound of a metal from Groups IIIb and IVb of the Table, it is not the case that the components (a) and (b) are previously mixed and then the mixture is employed as the polymerization catalyst. Such mixed catalyst is not suitable for the production of at least the alternating copolymer. In order to obtain the alternating copolymer according to the present invention the components (a) and (b) must be contacted each other in the presence of at least the conjugated compound (monomers of the group [B]). That is, for example, the copolymerization may be effected by contacting component (b) with the conjugated compound (monomer of the group [B]) previously and then adding component (a) thereto.

In the process of the present invention, the combination of monomers is of importance. No alternating copolymers can be obtained unless the monomers of the group [A] are combined with the monomers of the group [B].

In conventional radical polymerization, the polarity of solvent employed ordinarily has no substantial influence on the polymerization reaction, whereas in the process of the present invention, the use of polar solvents is not desirable, in general. Particularly, the use of solvents forming complexes with the metal components of the present invention is undesirable. For example, ethers such as ethylether, tetrahydrofuran and dioxane, ketones such as acetone, esters, nitriles and amides such as dimethylformamide are not usable, and alcohols and water are also unsuitable.

In the process of the present invention, when the polymerization is effected in the presence of oxygen or an organic peroxide, the polymerization reaction is promoted, in general, or the polymerization can be effected by use of a relatively small amount of catalyst. It is, however, needless to say that no alternating copolymers can be obtained by mere addition of oxygen or an organic peroxide to the monomer mixture of the present invention. It is also well known that polar monomers radical-polymerize by use of a combination of, for example, trialkylboron or trialkylaluminum and oxygen. This kind of catalyst system, however, does not give such alternating copolymers as in the process of the present invention.

The promoting mechanism of oxygen and organic peroxide in the process of the present invention is not sufficiently clear, but it is not considered that they show the same roles as those of conventional initiators in radical polymerization systems in which zinc chloride has been coordinated with methyl methacrylate or acrylonitrile. This is clear also from the fact that the polymerization in accordance with the present invention cannot be promoted by use of all kinds of radical initiators. In the process of the present invention, the excellent promoting effect can be seen only by addition of oxygen or an organic peroxide, and no effect can be attained at all in the case of using other radical initiator containing no oxygen, such as azobisisobutyronitrile.

In the present invention, the internal olefinic compounds having the formula:

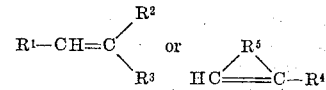

wherein $R^1$ to $R^5$ are as defined above, are 1,2-disubstituted or 1,2,2-trisubstituted ethylenically unsaturated hydrocarbons, halogen-containing unsaturated hydrocarbons or substituted radicals thereof and include linear and cyclic olefins. For example, those having as $R^1$ and $R^3$ alkyl, aryl, aralkyl, alkylaryl and cycloalkyl groups are desirable. Further, $R^2$ and $R^4$ are desirably hydrogen or said hydrocarbon groups, and $R^5$ is desirably a divalent group corresponding to any of said hydrocarbon groups. As the compounds having the formula

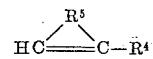

not only monocyclic compounds but also general polycyclic compounds and bridged ring compounds are used.

Examples of these compounds are butene-2, 2-methyl-butene-2, pentene-2, hexene-2, hexene-3, 2-methyl-pentene-2, 3-methyl-pentene-2, heptene-2, heptene-3, 3-methyl-hexene-3, 2,7-dimethyl-octene-4, decene-2, octadecene-2, γ-methallyl chloride, 1,5-dichloro-pentene-2, 1-chloro-3-methyl - butene - 2, 1-chloromethyl-butene-2, β-methyl-styrene, β-ethyl-styrene, 4-phenyl-butene-2, 5-phenyl-pentene-2, α,β-dimethyl-styrene, β,β-dimethyl-styrene, α-methyl-β-ethyl-styrene, 1,1-diphenyl-propene-1, stilbene, α-methyl-stilbene, α-methyl-p-chloro-styrene, α-chloromethyl-styrene, α-chloromethyl-α-methyl-styrene, α-propenyl naphthalene, 1-cyclohexyl-propene-1, cyclobutene, cyclopentene, cycloheptene, 1-methyl-cyclobutene-1, 4-chloro-cyclohexene, indene, β-bromo-indene, 3-methyl-indene, dihydronaphthalene, acenaphthylene, norbornene, 5 - methyl - norbornene, 5 - ethyl - norbornene, 5-phenyl-norbornene, 5-cyclohexyl-norbornene, 5-chloro-norbornene, 5,6-dichloro-norbornene, 7-chloro-norbornene, 2-methyl-norbornene, 1-methyl-2-methyl-norbornene, 7,7-dimethyl-norbornene, γ-fenchene, bornylene, 5-chloromethyl - norbornene, ω - chloromethyl - camphene, endo-camphene, α-pinene, mycenyl chloride, and 5-chloro-norbornene-cyclopentadiene codimer.

The polyene compounds with up to 30 carbon atoms having at least one carbon-carbon double bond containing at least 2 hydrogen atoms, which are shown in item (2) of the monomers of the group [A] in the present invention, include polyolefin compounds such as dienes, trienes and tetraenes, in which at least one of the double bonds is required to have at least 2 hydrogen atoms. Further, the polyene compounds may not only be hydrocarbons but may also be said compounds substituted by halogen or substituents having no inhibiting action on the polymerization reaction.

Examples of such compounds are 1,3-butadiene, isoprene,
1,3-pentadiene, 1,4-pentadiene,
1,4-hexadiene, 1,5-hexadiene,
2,3-dimethyl-1,3-butadiene,
6-methyl-1,5-heptadiene,
11-ethyl-1,11-tridecadiene,
2-vinyl-6-methyl-1,5-heptadiene (myrcene),
1,3,5-hexatriene,
2-methyl-1,3,5-hexatriene,
2-chloro-1,3-butadiene, 3-fluoro-1,4-hexadiene,
3-chloro-3,7-dimethyl-1,6-octadiene,
3-phenyl-1,4-hexadiene,
p-divinylbenzene,
p-diallylbenzene,
p-isopropenyl-styrene,
1,2-divinyl-cyclobutane, diallylcyclohexane,
1-vinyl-2-isopropenyl-cyclobutane, trivinylcyclohexane,
4-vinyl-cyclohexene-1,
3-methyl-4-allylcyclohexene-1,
1,2-divinyl-4,5-dimethyl-cyclohexene-4,
2-methyl-allyl-cyclopentene-1,
3-allyl-indene,
4,7,8,9-tetrahydroindene,
6-methyl-4,7,8,9-tetrahydroindene,
bicyclo (4,2,0)-octadiene-2,7,
fulvene, cyclohexadiene,
1,3-cyclopentadiene,
5-methyl-1,3-cyclopentadiene,
5-chloro-1,3-pentadiene,
1,5-cyclooctadiene,
1-methyl-1,5-cyclooctadiene,
1,4-cycloheptadiene,
1,3,5-cycloheptatriene,
1,5-9-cyclododecatriene,
Δ2,2'-dicyclopentenyl,
Δ3,3'-dicyclohexenyl,
dicyclopentadiene,
tricyclopentadiene,
2,5-norbornadiene,
5-methylene-2-norbornene,
5-methyl-2,5-norbornadiene,
5-vinyl-2-norbornene, 5-isopropenyl-2-norbornene,
5-(3'-butenyl)-2-norbornene,
2-vinyl-1,4-endomethylene-1,2,3,4,5,5a,8,8a-octahydronaphthalene,
2-vinyl-bicyclo-(2,2,2)-octene-5,
limonene, dipentene and
7-chloro-5-allyl-2-norbornene.

$R^6$ in the acetylene compounds having the formula $R^6C\equiv CR^7$ is hydrogen atom, a hydrocarbon radical having 1 to 20 carbon atoms or a substituted radical thereof, and includes, for example, saturated and unsaturated hydrocarbon groups such as alkyl, alkenyl, alkinyl, aryl, aralkyl, aralkenyl, alkylaryl, alkenylaryl, cycloalkyl and cycloalkenyl and compounds having in said groups halogen or other inert substituents. Further, $R^7$ is hydrogen or a polymerizable hydrocarbon radical having 1 to 20 carbon atoms or a polymerizable hydrocarbon radical having 1 to 20 carbon atoms which has been substituted by halogen or other inert substituent. A group having vinyl, vinylidene or vinylene-type double bond are exemplified as $R^7$. Examples of compounds belonging to this group are acetylene, methylacetylene, ethylacetylene, 1-hexine, phenylacetylene, cyclohexylacetylene, vinylacetylene, divinylacetylene, hexene-1-in-4, butenyl-methylacetylene, allyl-ethylacetylene, allyl-cyclohexylacetylene and allyl-(p-chlorophenyl)-acetylene. Of these monomers belonging to the group [A], those having a lower $e$ value in the Q-e scheme proposed by Price-Alfrey, especially those having an $e$ value of less than 0.5, preferably a minus $e$ value, give a favorable results.

The conjugated compounds represented by the formula

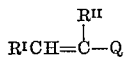

are those having as Q a nitrile group or

group, in which Y and $Z^1$ are as defined already. As the organic radicals having 1 to 20 carbon atoms which are represented by R, R' and R'' in Y, hydrocarbon radicals are preferable and derivative groups thereof are also usable. Examples thereof are alkyl, aryl, aralkyl, alkylaryl and cycloalkyl groups. Further, as the halogens, chlorine, bromine, iodine and fluorine are used. Me represents a monovalent portion of an element of Groups I to III of the Mendeleev's Periodic Table or an ammonium group. Such element includes, for example, lithium, sodium, potassium, rubidium, cesium, copper, silver, beryllium, calcium, strontium, barium, magnesium, zinc, cadmium, mercury, boron, aluminum and gallium. The monovalent portion referred to herein means that when a metal element of Groups I to III of the Mendeleev's Periodic Table is represented by Me', the Me belonging to a divalent element means Me'/2 and that of a trivalent element is Me'/3. That is, the above concretely corresponds to

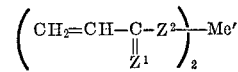

in the case of a divalent element and to

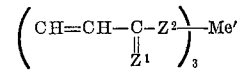

in the case of a trivalent element. Of those, monovalent salts, i.e. salts of elements of Group I, and ammonium salt are particularly preferable. That NR'R'' include the case where R' and R'' are mutually bonded at other portion than N signifies that, for example, morpholino, pyrrolidino and piperidino groups, are included.

In case both $R^I$ and $R^{II}$ are hydrogen, the conjugated compounds are acrylonitrile or compounds of acrylic or thioacrylic acid series. These compounds include acrylate, thiolacrylate, thionacrylate, dithioacrylate, acrylamide, thioacrylamide, N-substituted acrylamide, N-substituted thioacrylamide, N,N-disubstituted acrylamide, N,N-disubstituted thioacrylamide, acryloyl halides, thioacryloyl halides, acrylic acid, thioacrylic acid, thionacrylic acid, dithioacrylic acid, salts of said acids, acrolein and vinylketones.

In the case of the substituted vinyl compounds either $R^I$ or $R^{II}$ is hydrogen, the other one is a hydrocarbon radical, a halogen-containing hydrocarbon radical or a halogen, and may be a derivative group of the hydrocarbon having other substituent inert on the polymerization reaction. As the hydrocarbon radicals, alkyl, aryl, aralkyl, alkylaryl and cycloalkyl groups, for example, are frequently used. The halogens or halogens employed for substitution are chlorine, bromine, iodine and fluorine. Consequently, the above compounds are α- or β-substituted acrylonitrile or compounds of acrylic or thioacrylic acid series. Examples of these conjugated compounds are methyl acrylate, ethyl acrylate, n-butyl acrylate, n-amyl acrylate, octadecyl acrylate, allyl acrylate, o-tolyl acrylate, benzyl acrylate, cyclohexyl acrylate, 2-chloroethyl acrylate, β-chloroallyl acrylate, methyl thiolacrylate, ethyl thiolacrylate, methyl thionacrylate, methyl dithioacrylate, acrylamide, thioacrylamide, N-methyl acrylamide, N-n-butyl acrylamide, N-2-ethylhexyl acrylamide, N-stearyl acrylamide, N-cyclohexyl acrylamide, N-toluyl acrylamide, N-methyl thioacrylamide, N,N-dimethyl acrylamide, N-methyl-N-ethyl acrylamide, acrylyl morpholine, acrylyl pyrrolidine, N,N-dimethyl thioacrylamide, acryloyl chloride, acryloyl bromide, thioacryloyl chloride, acrylic acid, thiolacrylic acid, thionacrylic acid, dithioacrylic acid, sodium acrylate, potassium acrylate, zinc acrylate, aluminum acrylate, ammonium acrylate, acrolein, methyl-vinylketone, ethylvinylketone and phenylvinylketone. Further, examples of α- or β-substituted conjugated vinyl compounds are methyl methacrylate, ethyl methacrylate, butyl methacrylate, octadecyl methacrylate, benzyl methacrylate, phenyl methacrylate, tolyl methacrylate, cyclohexyl methacrylate, 2-chloroethyl methacrylate, methyl thiolmethacrylate, ethyl thiolmethacrylate, methyl α-ethylacrylate, ethyl α-butylacrylate, methyl α-cyclohexylacrylate, methyl α-phenylacrylate, methyl α-choroacrylate, methyl α-bromoacrylate, methyl α-chloromethylacrylate, methyl α-(p-chlorophenyl) acrylate, methacrylamide, N-ethylmethacrylamide, N-cyclohexyl-methacrylamide, N,N-dimethylmethacrylamide, methacrylyl piperidine, α-ethylacrylamide, α-chloroacrylamide, α-chloromethyl-acrylamide, methacryloyl chloride, α-chloroacryloyl chloride, α-ethyl methacryloyl chloride, methacrylic acid, thiolmethacrylic acid, sodium methacrylate, zinc methacrylate, aluminum methacrylate, aluminum α-fluoroacrylate, methacrolein, methylisopropenylketone, 1-chloro-butenylethylketone, methacrylonitrile, α-ethyl acrylonitrile, α-cyclohexyl acrylonitrile, α-chloroacrylonitrile, α-chloromethyl acrylonitrile, ethyl crotonate, phenyl crotonate, crotonamide, crotonic acid chloride, crotonitrile, methyl cinnamate, butyl cinnamate, chloromethyl cinnamate, cinnamic nitrile, methyl β-ethylacrylate and methyl β-chloromethyl acrylate. However, the compounds are not limited to the above compounds.

The catalyst components to be employed in the process of the present invention are (1) compounds having the formula:

MR'''$_n$X$_{3-n}$, M'R$^{IV}_3$ or M''X'$_3$ wherein M, M' and M'' are aluminum or boron; R''' and R$^{IV}$ are organic radicals; X and X' are halogens; and n is an arbitrary number of 1 to 2, or (2)(a) organic compounds of metals of Group IIb, IIIb or IVb of the Periodic Table and (b) halides of metals of Group IIIb or IVb of the Periodic Table.

In the compounds of aluminum or boron having the formula MR'''$_n$X$_{3-n}$, N'R$^{IV}_3$ or M''X'$_3$, R''' and R$^{IV}$ are preferably hydrocarbon radicals having 1 to 20 carbon atoms, or derivative groups having inert substituents may be used. There may be raised those having, for example, alkyl, alkenyl, aryl, aralkyl, alkylaryl or cycloalkyl groups. Examples thereof are methyl, ethyl, propyl, butyl, hexyl, octyl, decyl, dodecyl, stearyl, phenyl, tolyl, naphthyl, benzyl, cyclopentadienyl and cyclohexyl. As the X, there is used chlorine, bromine, iodine or fluorine.

Concretely, the compounds having the formula

MR'''$_n$X$_{3-n}$ include, for example, methylaluminum dichloride, ethylaluminum dichloride, isobutylaluminum dichloride, hexylaluminum dichloride, dodecylaluminum dichloride, phenylaluminum dichloride, cyclohexylaluminum dichloride, methylaluminum dibromide, ethylaluminum diiodide, vinylaluminum dichloride, ethylaluminum sesquichloride, ethylaluminum sesquibromide, ethylaluminum sesquifluoride, methylaluminum sesquichloride, diethylaluminum chloride, diethylaluminum fluoride, ethylphenylaluminum chloride, dicyclohexylaluminum chloride, methylboron dichloride, ethylboron dichloride, ethylboron diiodide, butylboron dichloride, hexylboron dichloride, dodecylboron dichloride, phenylboron dichloride, benzylboron dichloride, cyclohexylboron dichloride, diethylboron chloride, diethylboron bromide, dipropylboron chloride, dibutylboron chloride, dihexylboron chloride, ethylvinylboron chloride and dicyclopentadienylboron chloride. The compounds having the formula N'R$^{IV}_3$ include trimethylaluminum, triethylaluminum, tripropylaluminum, tributylaluminum, trihexylaluminum, tridecylaluminum, triphenylaluminum, tricyclohexylaluminum, tribenzylaluminum, trimethylboron, triethylboron, tributylboron, trihexylboron, diethylphenylboron, diethyl-p-tolylboron and tricyclohexylboron. The compounds having the formula M''X'$_3$ include aluminum trichloride, aluminum tribromide, aluminum triiodide, partially fluorinated aluminum chloride, boron trichloride, boron trifluoride, boron tribromide and boron triiodide.

The organo-compounds of metals of Group IIb, IIIb or IVb of the Mendeleev's Periodic Table which are used as the catalyst component (a) of item (2) in the process of the present invention are those having, as metal components thereof, zinc, cadmium, mercury, boron, aluminum, gallium, indium, thallium, germanium, tin and lead. Particularly, the metal components of zinc, boron, aluminum and tin are frequently employed. As the organic groups, hydrocarbon groups or derivative groups thereof are preferable and those having alkyl, alkenyl, aryl, aralkyl, alkylaryl and cycloalkyl groups are particularly effective. These organo-metallic compounds, include also the case where other groups than organic groups are attached to the metal. Particularly useful are organo-metallic compounds having the general formula:

M'''R$^v_n$X''$_{p-n}$ wherein M''' is a metal of Group IIb, IIIb or IVb of the Periodic Table; R$^v$ is a hydrocarbon group having 1 to 20 carbon atoms or a substituent thereof; p is the valency of the metal; and n is an arbitrary number of 1 to p. The organo-metallic compounds are particularly effective when n=p. Of course, other organic compounds of metals of Group IIb, IIIb or IVb of the Periodic Table may also be used, if necessary. These compounds include, for example, diethylzinc, ethylzinc chloride, diethylcadmium, diethylmercury, diphenylmercury, triethylboron, tributylboron, tricyclohexylboron, ethylboron bromide, triethylaluminum, trihexylaluminum, tricyclohexylaluminum, vinyldiethylaluminum, diethylaluminum chloride, ethylaluminum sesquichloride, ethylaluminum dichloride, trimethylgallium, triethylgallium, triethylindium, tetraethylgermanium, tetramethyltin, tetraethyltin, tetraisobutyltin, dimethyldiethyltin, tetraphenyltin, terabenzyltin, diethyldiphenyltin, triethyltin chloride, diethyltin dichloride, ethyltin trichloride, tetramethyllead, tetraethyllead, dimethyldiethyllead and triethyllead chloride.

On the other hand, the metal halides to be used as the catalyst component (b) are halides of metals of Group IIIb or IVb of the Periodic Table and include, for example, compounds of boron, aluminum, gallium, indium, thallium, germanium, tin and lead. As the halogen, there is used any of chlorine, bromine, iodine and fluorine. As these metal halides, those having other groups than halogens may also be used. Particularly preferable metal halides in the process of the present invention are compounds having the general formula M$^{IV}$X$_m$'''R$^{VI}_{q-m}$ wherein M$^{IV}$ is a metal of Group IIIb or IVb of the Periodic Table; X''' is a halogen atom; R$^{VI}$ is a hydrocarbon group having 1 to 20 carbon atoms or a substituent thereof; q is the valency of the metal; and m is an arbitrary number of 1 to q. When m=q, favorable results are easily obtained. Of course, other halides of metals of Group IIIb or IVb of the Periodic Table may also be used, if necessary. Examples of metal halides useful for the process of the present invention are boron trichloride, boron trifluoride, boron tribromide, boron triiodide, ethylboron dichloride, diethylboron chloride, aluminum trichloride, aluminum tribromide, aluminum triiodide, aluminum chloride partial fluoride, ethylaluminum dichloride, methylaluminum dibromide, ethylaluminum sesquichloride, diethylaluminum chloride, gallium trichloride, gallium dichloride, germanium tetrachloride, tin tetrachloride, tin tetrabromide, tin tetraiodide, ethyltin trichloride, methyltin trichloride, phenyltin trichloride, dimethyltin dibromide, diethyltin dichloride, diisobutyltin dichloride, triethyltin chloride, lead tetrachloride and diethyllead dichloride.

In the catalysts of item (2), in case there is used the combination of the catalyst component (a) an organo-compound of a metal of Group IIb, IIIb or IVb of the Periodic Table and the catalyst component (b) a halide of a metal of Group IIIb or IVb, the organo-metallic compound and the metal halide are employed without previous mixing. The mixing of said components is desirably effected in the presence of at least said conjugated compound. Particularly favorable results are obtained when the organo-metallic compound is added after the conjugated compound and the metal halide have previously been mixed.

The organic peroxides to be used in the process of the present invention are the general organic compounds having peroxide linkages, and include, for example, diacyl peroxides, ketone peroxides, aldehyde peroxides, ether peroxides, hydroperoxides, dihydrocarbyl peroxides, peracid esters, dihydrocarbyl percarbonates and percarbamates. Examples of these compounds are benzoyl peroxide, lauroyl peroxide, 2,4-dichlorobenzoyl peroxide, 4-chlorobenzoyl peroxide, acetyl peroxide, stearoyl peroxide, phthaloyl peroxide, methylethylketone peroxide, cyclohexanone peroxide, t-butyl hydroperoxide, p-menthane hydroperoxide, diisopropylbenzene hydroperoxide, cumene hydroperoxide, di-t-butyl peroxide, dicumyl peroxide, t-butyl cumyl peroxide, t-butyl perbenzoate, t-butyl perisobutylate, t-butyl peracetate, t-butyl peroxypivalate, phenyl percarbamate, diisopropyl percarbamate, and t-butyl perisopropyl carbonate, but the compounds are not limited thereto.

There is observed such a tendency that the higher the rate of radical decomposition of the peroxide, the higher the promoting action of the peroxide.

In practicing the present invention, the catalyst components may be used at any proportions, but a proportion of 0.05–10 moles, particularly 0.02–1.5 moles, per mole of the conjugated monomer is frequently employed. Generally speaking, favorable results are obtained when the conjugated monomer is used in combination with substantially an equimolar amount of the halogen-containing metal compound. Of course, the metal compound may be used in excess or in less amount. However, in case the halogen-containing metal component is used in excessively smaller amount than the conjugated monomer, the polymerization activity is greatly lowered, in some cases, and therefore it is not desirable to make the concentration thereof excessively low. Generally, at relatively low concentrations, it is effective to carry out the polymerization particularly in the presence of an organic peroxide or oxygen. The effects of organic peroxide or oxygen are markedly displayed even at such a low temperature as −78° C., for example. Even when these components are used in relatively small amounts, sufficiently high effects can be expected. For example, promoting action can be observed by addition of said components in amounts of about 0.01–5% of the conjugated monomer. Of course, the components can be effectively employed even at higher or lower concentrations than above. Generally speaking, desirable results can be attained by contacting and complexing the halogen-containing metal compound with the conjugated monomer in the absence of oxygen or organic peroxide. Depending on the conditions, however, the catalyst components may be added later to the monomer mixture.

As the polymerization temperature, any temperature may be selected from the range of from such a low temperature as −150° C. to such a temperature as +100° C. The copolymerization reaction in accordance with the process of the present invention quickly progresses even at markedly low temperatures. This indicates the fact that there is a greatly low activation energy.

In the practice of the process of the present invention, bulk-polymerization can be effected in liquid monomers, but ordinary inert solvents may also be used. As such solvents, there are employed ordinary hydrocarbons or halogen-containing hydrocarbon compounds, for example. Examples of such solvents are propane, butane, pentane, hexane, heptane, octane, ligroin, petroleum ether, other petroleum series mixed solvents, benzene, toluene, xylene, cyclohexane, methylcyclohexane, methylene dichloride, ethylene dichloride, trichloroethylene, tetrachloroethylene, butylchloride, chlorobenzene and bromobenzene. As has already been mentioned, compound forming stable complexes with the catalyst components are not desirable as solvents.

After completion of the polymerization reaction, after-treatments are effected according to ordinary procedures to purify and recover polymerization resultants. As such procedures, there are optionally adopted, for example, alcohol treatment, alcohol-hydrochloric acid treatment, hydrochloric acid-water treatment, or any after-treatment procedures employed in conventional cationic polymerization using Lewis acids, or in polymerization using Ziegler-Natta type catalysts. However, it is also possible to adopt procedures of separating and recovering catalyst components from polymerization resultants, without decomposing the catalyst components, by addition of compounds forming complexes with said components.

The following examples illustrate the present invention further in detail, but the invention is not limited thereto at all:

EXAMPLE 1

A 100 ml. three-necked flask was evacuated and flushed with nitrogen, then was cooled to −78° C. with Dry Ice-methanol. Into this flask, 20 ml. of heptane and 2 g. of acrylonitrile were charged in a nitrogen atmosphere, and the compounds were homogeneously mixed. To the flask, 25 mmol of ethylaluminum sesquichloride ($Al_2Et_3Cl_3$) was further added. The mixture was elevated to 0° C. with stirring, and butene-2 (a cis and trans type-mixture) was injected in a gaseous state into the system to effect polymerization. After 4 hours, the content was incorporated with methanol to terminate the polymerization and was then taken out, and insolubles were recovered by filtration. The solid obtained was treated with hydrochloric acid-methanol, was thoroughly washed with methanol and was then dried at 50° C. under reduced pressure to obtain 1.56 g. of a white copolymer. This copolymer was soluble in acetone. The copolymer, which had been reprecipitated and purified with an acetone-methanol system, showed by elementary analysis, values of carbon: 76.07%, hydrogen: 10.19%, and nitrogen: 12.43%, which well coincided with the calculated values of a 1:1 alternating copolymer which were carbon: 77.01%, hydrogen: 10.16%, and nitrogen 12.83%. Further, the infrared absorption spectrum of the copolymer showed the presence of butene-2 and acrylonitrile, and the amount of methyl group measured from the absorption degree well coincided with the calculated value of a 1:1 copolymer. The intrinsic viscosity of the copolymer measured in dimethylformamide solution at 30° C. was 0.14 dl./g.

Further, a film was prepared from the copolymer which showed a specific gravity of 0.9233 when measured at 23° C. according to density gradient tube method. This copolymer had a softening point of 85°–88° C.

The similar copolymer was obtained also in the case where diethylboron chloride was used in place of the ethylaluminum sesquichloride.

EXAMPLE 2

A 300 ml. glass autoclave with electromagnetic stirrer was evacuated, flushed with nitrogen. In the autoclave, 50 ml. of toluene, 2.1 g. of acrylonitrile and 40 mmol. of tin tetrachloride were admixed in a nitrogen atmosphere. The mixture was cooled to −78° C. and 45 g. of butene-2 was liquefied thereinto. To the mixture were added 40 mmol. of triethylaluminum and 5 mmol. of benzoyl peroxide. Thereafter, the temperature was elevated to 0° C.

and polymerization was effected for 47 hours with stirring. Then, the same after-treatments as in Example 1 were carried out to obtain 2.70 g. of a white solid copolymer. The result of elementary analysis of said copolymer showed that the copolymer contained 12.15% of nitrogen which are well coincided with the calculated value 12.83% of an alternating copolymer.

EXAMPLE 3

A 300 ml. three-necked flask was evacuated, flushed with nitrogen and was cooled to —78° C. with Dry Ice-methanol. Into this flask, 50 g. of butene-2 and 40 g. of methyl acrylate were charged in a nitrogen atmosphere, and the compounds were homogeneously mixed. To the flask, 50 mmol. of ethylaluminum dichloride (AlEtCl$_2$) was further added and polymerization was effected at —5° C. for 2 hours. Subsequently, the same after-treatments as in Example 1 were carried out to obtain 1.17 g. of a white solid copolymer. The intrinsic viscosity of the copolymer measured in benzene solution at 30° C. was 0.58 dl./g. The elementary analysis values of the copolymer well coincided with the calculated values as a 1:1 alternating copolymer. Further, even when the monomer composition was variously changed, the polymer composition was always 1:1, and therefore it was judged that said copolymer was an alternating copolymer.

EXAMPLE 4

The same polymerization as in Example 3 was effected, except that 25 mmol. of methylaluminum sesquichloride (Al$_2$Me$_3$Cl$_3$) was used in place of the ethylaluminum dichloride and the polymerization was conducted at —20° C., whereby 0.22 g. of a butene-2-methyl acrylate copolymer was obtained.

EXAMPLE 5

In Example 1, 4 g. of methyl acrylate was used in place of the acrylonitrile and the polymerization was effected for 5 hours, whereby 1.16 g. of a white solid copolymer was obtained. This copolymer was soluble in benzene and acetone and had a specific gravity of 1.085 at 23° C. The result of elementary analysis of the copolymer well coincided with the calculated values of a 1:1 alternating copolymer.

EXAMPLE 6

In a 300 ml. three-necked flask, 3.4 g. of methyl acrylate, 40 mmol. of tin tetrachloride and 50 ml. of toluene were admixed in a nitrogen atmosphere, and the mixture was cooled to —78° C. In the mixture, 45 g. of butene-2 was liquefied and 40 mmol. of triethylaluminum was added to the mixture. Further, the gas phase was substituted with a nitrogen gas containing 5% of oxygen, and polymerization was conducted with stirring at —78° C. for 1 hour and 45 minutes, while injecting said gas, to obtain 2.01 g. of an alternating copolymer. The result of elementary analysis of the copolymer were carbon: 66.55% and hydrogen: 9.23%, which are well coincided with the calculated values of a 1:1 alternating copolymer.

EXAMPLE 7

A 100 ml. three-necked flask was evacuated, flushed with nitrogen and was cooled to —78° C. with Dry Ice-methanol. Into this flask, 20 ml. of heptane and 4 g. of methyl acrylate were charged in a nitrogen atmosphere, and the compounds were homogeneously mixed. To the flask, 50 mmol. of ethylaluminum dichloride was further added. After elevating the temperature to —5° C. with stirring, 15 g. of liquefied cis-butene-2 was added and polymerization was effected for 4 hours to obtain 0.63 g. of a copolymer. The intrinsic viscosity of the copolymer was 0.52 dl./g. The copolymer was subjected to pressing to obtain an excellent film showing a specific gravity at 23° C. of 1.095. It softened at 81°–84° C.

EXAMPLE 8

Polymerization was effected for 5 hours in entirely the same manner as in Example 7, except that trans-butene-2 was used in place of the cis-butene-2, whereby 0.63 g. of a copolymer was obtained.

The copolymer had an intrinsic viscosity of 0.53 dl./g. and a specific gravity at 23° C. of 1.087.

EXAMPLE 9

In Example 1, 6 g. of n-butyl acrylate was used in place of the acrylonitrile and the polymerization was effected for 5 hours, whereby 4.59 g. of a copolymer was obtained. The result of elementary analysis of the copolymer were carbon: 70.56% and hydrogen: 9.44%, which were cell coincided with the calculated values carbon: 71.70% and hydrogen: 10.94% of a 1:1 alternating copolymer.

EXAMPLE 10

In the same apparatus as in Example 2, 4 g. of methyl thiolacrylate and 50 ml. of cyclohexane were mixed, and 40 mmol. of boron trifluoride was added to the mixture at —78° C. Into the mixture 45 g. of butene-2 was liquefied and 40 mmol. of tin tetrachloride and 0.1 mmol. of cumene hydroperoxide were added to the mixture. Subsequently, the temperature was elevated to 25° C. and polymerization was effected for 5 hours to obtain 1.07 g. of a copolymer.

EXAMPLE 11

In Example 1, 4.5 g. of N-ethyl-acrylamide was used in place of the acrylonitrile and polymerization was effected for 1.5 hours to obtain 3.62 g. of a white solid copolymer.

EXAMPLE 12

A 100 ml. three-necked flask was evacuated, flushed with nitrogen and was cooled to —78° C. with Dry Ice-methanol. Into the flask, 20 ml. of heptane and 4 g. of methyl acrylate were charged in a nitrogen atmosphere, and the compounds were homogeneously mixed. To the mixture, 50 mmol. of ethylaluminum dichloride was added, and the mixture was elevated in temperature to —5° C. with stirring. To the mixture, 13 g. of 2-methyl-butene-2 was added and polymerization was effected for 5 hours. After the reaction, the same after-treatments as in Example 1 were conducted to obtain 0.63 g. of a white copolymer. This copolymer was soluble in acetone. The result of elementary analysis of the copolymer reprecipitated and purified with an acetone-methanol system were carbon: 68.37% and hydrogen: 9.83% which were well coincided with the calculated values carbon: 69.19% and hydrogen: 10.32% of a 1:1 copolymer. The intrinsic viscosity of the copolymer measured in benzene solution at 30° C. was 0.53 dl./g. Further, the specific viscosity of the copolymer at 23° C. was 1.069.

EXAMPLE 13

Into a 200 ml. three-necked flask provided with a stirrer, 20 ml. of toluene and 3 g. of methyl acrylate were charged, and 12.5 mmol. of ethylaluminum sesquichloride was further introduced. To the mixture, 10 g. of β-methylstyrene was added with stirring at 25° C. and polymerization was effected for 10 hours to obtain 1.43 g. of a copolymer. The result of elementary analysis of the copolymer were carbon: 76.62% and hydrogen: 8.02% which were well coincided with the calculated values carbon: 76.40% and hydrogen: 7.90% of a 1:1 alternating copolymer.

Even when the composition of methyl acrylate and β-methyl styrene was variously changed in the above polymerization system, 1:1 copolymers were always obtained, and therefore it could be judged that the above copolymer was an alternating copolymer. Further, the similar copolymer was obtained when the same polymerization as above was carried out by use of 10 g. of p-chloro-β-methyl-styrene in place of the β-methyl-styrene.

EXAMPLE 14

In a 100 ml. three-necked flask, 30 ml. of toluene, 3 g. of methyl acrylate and 12.5 mmol. of ethyl-aluminum sesquichloride were mixed in a nitrogen atmosphere. To the mixture, 10 g. of trans-stilbene was added at 25° C., and polymerization was effected with stirring to obtain 1.87 g. of a copolymer. The copolymer had an intrinsic viscosity of 0.51 dl./g. and a specific gravity of 1.090, and was observed to be melted at 204°–208° C. The elementary analysis values of the copolymer were carbon: 80.82% and hydrogen: 7.12% which were well coincided with the calculated values carbon: 81.12% and hydrogen: 6.81% of a 1:1 alternating copolymer.

EXAMPLE 15

A 100 ml. three-necked flask provided with a stirrer was cooled to −78° C. in nitrogen atmosphere with Dry Ice-methanol. To the flask, 2 g. of acrylonitrile and 15 g. of cyclopentene were charged in a nitrogen atmosphere, and the flask was maintained at −78° C. To the flask, 25 mmol. of ethylaluminum sesquichloride was added, and polymerization was effected for 1 hour and 45 minutes. After the polymerization, the same after-treatments as in Example 1 were carried out to obtain 0.66 g. of a white solid copolymer. The elementary analysis values of this copolymer were carbon: 78.69%, hydrogen: 9.87% and nitrogen: 11.93%, and well coincided with the calculated values carbon: 79.29%, hydrogen: 9.15% and nitrogen: 11.56% of a 1:1 copolymer.

EXAMPLE 16

In Example 15, 2 g. of methyl acrylate was used in place of the acrylonitrile and 12.5 mmol. of ethylaluminum sesquichloride in place of the ethylaluminum dichloride, and polymerization was effected for 3 hours to obtain 1.12 g. of a white solid copolymer. The copolymer was soluble in acetone and the result of elementary analysis of the copolymer purified with acetone-methanol were carbon: 68.06% and hydrogen: 9.52% which were well coincided with the calculated values carbon: 70.10% and hydrogen: 9.15% of a 1:1 copolymer. Further, the specific gravity of the copolymer measured at 23° C. was 1.134.

EXAMPLE 17

A 100 ml. three-necked flask was cooled to −78° C. in a nitrogen atmosphere. In this flask, 20 ml. of n-heptane, 4 g. of acrylonitrile and 25 mmol. of ethyl-aluminum sesquichloride were mixed. After stirring homogeneously, the mixture was elevated in temperature to 0° C. To the mixture, 10 g. of indene was added and polymerization was effected for 10 minutes to obtain 2.72 g. of an acetone-soluble copolymer. The result of elementary analysis of the copolymer were carbon: 84.46%, hydrogen: 7.08% and nitrogen: 8.29%, which were well coincided with the calculated values carbon: 85.17%, hydrogen: 6.55% and nitrogen: 8.29% of a 1:1 alternating copolymer. The copolymer had a specific gravity of 1.138 at 23° C. and was observed to be melted at 187°–190° C.

EXAMPLE 18

In a 100 ml. three-necked flask, 20 ml. of n-heptane, 4 g. of methyl acrylate and 50 mmol. of ethyl-aluminum dichloride were mixed. To the mixture, 10 g. of 1,4-dihydro-naphthalene was added at 25° C. and polymerization was effected for 5 hours with stirring to obtain 7.01 g. of a white solid copolymer. The copolymer had an intrinsic viscosity of 0.76 dl./g. and a specific gravity at 23° C. of 1.121, and melted at 136°–140° C. The result of elementary analysis of the copolymer were carbon: 78.09% and hydrogen: 8.25%, which were well coincided with the calculated values carbon: 77.75% and hydrogen: 7.46% of a 1:1 alternating copolymer.

EXAMPLE 19

A 100 ml. three-necked flask provided with a stirrer was cooled to −78° C. with Dry Ice-methanol. Into this flask, 20 ml. of toluene and 3 g. of methyl acrylate were charged in nitrogen atmosphere, and the compounds were homogeneously mixed. To the mixture, 12.5 mmol. of ethylaluminum sesquichloride was added. The liquid was elevated in temperature to 25° C. with stirring, and 10 g. of norbornene was added to the liquid. After polymerization at 25° C. for 3 hours, the same after-treatments as in Example 1 were carried out to obtain 3.78 g. of a white solid copolymer. The copolymer had a specific gravity of 1.111 at 23° C. and melted at 161°–165° C. The result of elementary analysis of the copolymer were carbon: 72.88% and hydrogen: 8.87%, and well coincided with the calculated values carbon: 73.30% and hydrogen: 8.95% of a 1:1 alternating copolymer.

EXAMPLE 20

In Example 19, 17.6 g. of phenyl-norbornene was used in place of the norbornene, and the mixture was reacted for 30 hours with 2.5 g. of methyl acrylate to obtain 3.58 g. of a copolymer. The result of elementary analysis values of the copolymer were carbon: 78.67% and hydrogen: 8.02% and well coincided with the calculated values carbon: 79.65% and hydrogen: 7.86% of a 1:1 alternating copolymer.

EXAMPLE 21

A 100 ml. three-necked flask was cooled to −78° C. in a nitrogen atmosphere. In the flask, 10 ml. of toluene, 1.5 g. of methyl acrylate and 6.3 mmol. of ethtylaluminum sesquichloride were mixed. The mixture was elevated in temperature to 25° C. with stirring. To a mixture, 5.5 g. of 5-chloro-norbornene was added and polymerization was effected for 24 hours to obtain 1.47 g. of a white solid copolymer having an intrinsic viscosity of 1.00 dl./g. The result of elementary analysis of said copolymer were carbon: 60.80%, hydrogen: 6.38% and chlorine: 17.83% which were well coincided with the calculated values carbon: 61.54%, hydrogen: 7.04% and chlorine: 16.51% of a 1:1 alternating copolymer.

EXAMPLE 22

A 200 ml. four-necked flask was cooled to −78° C. in a nitrogen atmosphere. To the flask, 8.6 g. of methyl acrylate, 20.4 g. of α-pinene and 30 mg. of benzoyl peroxide were added in this order and were admixed. To the mixture, 12.5 mmol. of ethylaluminum sesquichloride (as 0.2 g./ml. toluene solution) was added, and the temperature was elevated to 0° C. Subsequently, polymerization was effected with stirring for 67 hours to obtain 2.01 g. of a white solid copolymer.

EXAMPLE 23

A 200 ml. three-necked flask provided with a stirrer was evacuated and flushed with nitrogen. Into the flask, 19.3 g. of chloronorbornene and 10 g. of methyl methacrylate were charged and the compounds were thoroughly stirred. The mixture was maintained at 0° C. To the mixture, 38 mg. of cumene hydroperoxide was added and then 12.5 mmol. of ethylaluminum sesquichloride (as 0.2 g./ml. toluene solution) was added, and polymerization was effected at 0° C. for 20 hours to obtain 2.16 g. of a white solid copolymer.

EXAMPLE 24

To a 200 ml. three-necked flask, 20 ml. of n-heptane, 10 g. of 1,3-pentadiene and 5.3 g. of acrylonitrile were added in this order in a nitrogen atmosphere and the compounds were homogeneously mixed. To the flask, 25 mmol. of ethylaluminum sesquichloride (as 40 g./100 ml. n-heptane solution) was added at 0° C. and reaction was effected for one hour. The reaction product was charged into a large amount of methanol, a deposited solid was thoroughly washed with methanol and was dried in vacuo at 40° C. to obtain 7.44 g. of a white solid copolymer. The copolymer showed an intrinsic viscosity of 0.82 dl./g. when measured in dimethylformamide solution at 30° C. The nitrogen content thereof according to elementary analysis was 12.06% and well coincided with the calculated value 11.56% as an alternating copolymer.

EXAMPLE 25

According to the same procedure as in Example 24, 20 ml. of cyclohexane, 3 g. of methyl thiolacrylate, 25 mmol. of ethylaluminum sesquichloride and 10 g. of 1,4-pentadiene were added in this order at 0° C. in a nitrogen atmosphere, and polymerization was effected with stirring for 5 hours to obtain 1.03 g. of a copolymer.

EXAMPLE 26

According to the same procedure as in Example 24, 20 ml. of n-heptane and 50 mmol. of ethylaluminum sesquichloride were mixed in a nitrogen atmosphere and the mixture was cooled to −78° C. To the mixture, 4 g. of acrylonitrile was added. After elevating the temperature to 0° C., 15 g. of isoprene was added to the mixture, and polymerization was effected with stirring for 10 minutes to obtain 4.17 g. of a yellowish white solid copolymer.

Separately, according to the same operations as above, 50 mmol. of tin tetrachloride was used in place of the ethylaluminum sesquichloride to form a complex with the acrylonitrile. To the complex, 50 mmol. of triethylaluminum and 15 g. of isoprene were added and the compounds were homogeneously admixed. To the mixture, 0.1 mmol. of benzoyl peroxide was added and copolymerization was effected to obtain 1.72 g. of a copolymer.

EXAMPLE 27

In a 300 ml. three-necked flask, 150 ml. of n-heptane, 10 mmol. of ethylaluminum dichloride and 5 g. of acrylonitrile were mixed. To the mixture, 15 g. of butadiene was added with stirring at −78° C., and polymerization was effected for 5 minutes to obtain 0.81 g. of a solid copolymer. The result of nitrogen analysis of said copolymer was 13.07% which was well coincided with the calculated value of 12.88% as an alternating copolymer.

EXAMPLE 28

In a 200 ml. three-necked flask, 20 ml. of n-heptane, 25 mmol. of ethylalumuinum sesquichloride and 4.5 g. of N-ethylacrylamide were mixed in a nitrogen atmosphere. To the mixture, 15 g. of 2-chloro-1,3-butadiene and 0.5 mmol. of cumene hydroperoxide were added with stirring at 0° C., and polymerization was effected for 5 hours to obtain 2.18 g. of a copolymer.

EXAMPLE 29

In a 200 ml. three-necked flask, 20 ml. of toluene, 3 g. of methyl methacrylate and 10 g. of p-isopropenyl styrene were mixed in a nitrogen atmosphere. To the mixture, 25 mmol. of ethylboron dichloride was added at 25° C. and polymerization was effected for 5 hours to obtain 0.78 g. of a white solid copolymer.

EXAMPLE 30

In a 100 ml. three-necked flask, a solution of 50 mmol. of ethylaluminum sesquichloride in a small amount of n-heptane and 4 g. of methyl acrylate were mixed at −78° C. in a nitrogen atmosphere. To the mixture, 8.1 g. of 4-vinyl cyclohexene was added, and reaction was effected for 10 minutes to obtain 1.04 g. of a yellowish soft solid copolymer.

EXAMPLE 31

To a 200 ml. three-necked flask, 20 ml. of n-heptane, 4 g. of methyl acrylate and 25 mmol. of ethylaluminum sesquichloride were added in this order in a nitrogen atmosphere. Into the flask, 15 g. of cyclopentadiene was charged, and polymerization was effected at 0° C. for 20 minutes to obtain 0.42 g. of a yellow paste-like copolymer.

EXAMPLE 32

In a 200 ml. three-necked flask, 20 ml. of ethylene dichloride, 16 g. of cyclooctadiene and 5.3 g. of acrylonitrile were mixed in a nitrogen atmosphere. To the mixture, 50 mmol. of ethylaluminum sesquichloride was added at 25° C., and polymerization was effected for 2 hours to obtain 1.45 g. of a white solid copolymer.

EXAMPLE 33

In a 200 ml. three-necked flask, 20 ml. of toluene and 2 g. of acrylonitrile were mixed in a nitrogen atmosphere. To the mixture, 25 mmol. of boron trichloride was added at −78° C. to form a complex. After elevating the temperature to −10° C., the complex was mixed with 25 mmol. of diethyl zinc and 15 g. of 5-vinyl-2-norbornene, and at the same time, polymerization was effected for 3 hours, while introducing a nitrogen gas containing 5% of oxygen to obtain 3.09 g. of a copolymer.

EXAMPLE 34

In a 200 ml. three-necked flask, 20 ml. of n-heptane, 30 mmol. of ethylaluminum sesquichloride and 3 g. of methyl acrylate were mixed in a nitrogen atosphere. To the mixture, 10 g. of phenylacetylene was added, while maintaining the temperature at 0° C., and polymerization was effected for 2 hours to obtain 2.70 g. of a solid copolymer. The result of elementary analysis of the copolymer were C: 76.91% and H: 6.59% which were well coincided with the calculated values C: 76.57% and H: 6.43% as an alternating copolymer.

EXAMPLE 35

In a 200 ml. three-necked flask, 20 ml. of n-heptane and 3 g. of ethyl acrylate were mixed in a nitrogen atmosphere, and the mixture was cooled to −20° C. To the mixture was added a solution prepared by mixing and reacting 25 ml. of aluminum chloride with 25 mmol. of trihexylaluminum in 50 ml. of n-heptane. Into the mixture, 10 g. of butenylmethyl acetylene was further incorporated, and polymerization was effected with stirring for 5 hours to obtain 1.22 g. of a solid copolymer.

We claim:

1. A copolymer consisting essentially of a 1:1 alternating copolymer of monomer (A) and monomer (B), wherein monomer (A) is an unsaturated hydrocarbon compound selected from the group consisting of (1) an internal olefinic compound having the formula:

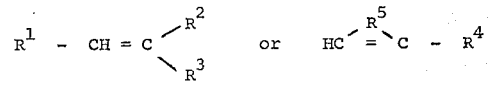

wherein $R^1$ and $R^2$ each are hydrocarbon radicals having 1 to 20 carbon atoms or halogen-containing hydrocarbon radicals having 1 to 20 carbon atoms; $R^3$ and $R^4$ are hydrogen atoms, hydrocarbon radicals having 1 to 20 carbon atoms or halogen-containing hydrocarbon radicals having 1 to 20 carbon atoms; and $R^5$ is a cyclic hydrocarbon group having 1 to 20 carbon atoms or a halogen-containing cyclic hydrocarbon group having 1 to 20 carbon atoms, provided that $R^1$ to $R^5$ contain no polymerizable unsaturated linkages; (2) a polyenic - hydrocarbon or -halohydrocarbon compound having up to 30 carbon atoms and containing from two to four carbon-carbon double bonds wherein a total of at least 2 hydrogen atoms are attached to the carbon atoms of at least one of said double bonds; and (3) an acetylene compound having the formula:

wherein $R^6$ is a hydrogen atom or a hydrocarbon or halohydrocarbon radical having 1 to 20 carbon atoms selected from the group consisting of alkyl, alkenyl, alkinyl, aryl, aralkyl, aralkenyl, alkylaryl, alkenylaryl, cycloalkyl and cycloalkenyl; and $R^7$ is a hydrogen atom or a hydrocarbon or halohydrocarbon radical having 2 to 20 carbon atoms and containing one polymerizable unsaturated group; and wherein monomer (B) is a conjugated compound having the formula:

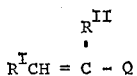

wherein $R^I$ and $R^{II}$ each are hydrocarbon radicals having 1 to 20 carbon atoms, halogen-containing hydrocarbon radicals having 1 to 20 carbon atoms, halogen or hydrogen atoms, provided that at least one of $R^I$ and $R^{II}$ is a hydrogen atom; Q is a nitrile group or

group, wherein Y is selected from the group consisting of $Z^2H$, $Z^2R$, $-Z^2)_kMe$, $NR'R''$, and R group, a halogen atom and a hydrogen atom, wherein $Z^1$ and $Z^2$ each are an oxygen or a sulfur atom; R is a hydrocarbon or halohydrocarbon radical having 1 to 20 carbon atoms, and $R'$ and $R''$ each are selected from the group consisting of a hydrogen atom and a hydrocarbon or halohydrocarbon radical having 1 to 20 carbon atoms, including the case where $R'$ and $R''$ are mutually bonded at other portion than nitrogen; and Me represents an element of Groups I to III of Mendeleev's Periodic Table, wherein k is equal to the valency of Me, or an ammonium group.

2. An alternating copolymer according to claim 1, wherein said unsaturated hydrocarbon compound is a linear 1,2-disubstituted ethylenically unsaturated hydrocarbon, a cyclic 1,2-disubstituted ethylenically unsaturated hydrocarbon, a linear 1,2,2-trisubstituted ethylenically unsaturated hydrocarbon, a cyclic 1,2,2-trisubstituted ethylenically unsaturated hydrocarbon, or a halogen-containing unsaturated hydrocarbon thereof.

3. An alternating copolymer according to claim 1, wherein said unsaturated hydrocarbon compound or substituted compound thereof is a diene, or a halogen substitituted diene thereof, with up to 30 carbon atoms having at least one carbon-carbon double bond containing at least 2 hydrogen atoms.

4. An alternating copolymer according to claim 1, wherein said unsaturated hydrocarbon compound (A) is (3) an acetylene compound.

5. An alternating copolymer according to claim 1, wherein said conjugated compound is a conjugated vinyl compound selected from the group consisting of an acrylate, a thiolacrylate, a thionacrylate, a dithioacrylate, an acrylamide, a thioacrylamide, an N-substituted acrylamide, an N-substituted thioacrylamide, an N,N-disubstituted acrylamide, an N,N-disubstituted thioacrylamide, an acryloyl halide, a thioacryloyl halide, an acrylic acid, a thiolacrylic acid, a thionacrylic acid, a dithioacrylic acid, Groups I to III metal salts or ammonium salts of said acids, acrolein, a vinylketone and acrylonitrile, or a substituted conjugated vinyl compound in which the α- or β-position of the vinyl group thereof is substituted with a hydrocarbon group, a halogen-containing hydrocarbon group or a halogen atom.

6. A process for producing an alternating copolymer, which comprises contacting at a temperature of from about $-150°$ C. to about $+100°$ C. monomer (A) and monomer (B) defined in claim 1 with an organometal halide selected from the group consisting of alkylaluminum dihalide, alkylaluminum sesquihalide, dialkylaluminum halide, alkylboron dihalide and dialkylboron halide.

7. A process for producing an alternating copolymer, which comprises contacting at a temperature of from about $-150°$ C. to about $+100°$ C. monomer (A) and monomer (B) as defined in claim 1 with a catalyst (1) an organo-metal halide having the formula:

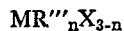

wherein M is aluminum or boron; $R'''$ is a hydrocarbon radical of 1 to 20 carbon atoms; X is a halogen atom; and n is an arbitrary number of from 1 to 2, or with a catalyst (2) comprising component (a) an organo-compound having the formula:

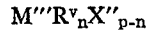

where $M'''$ is a metal of Group IIb, IIIb or IVb of Mendeleev's Periodic Table; $X''$ is a halogen atom; $R^v$ is a hydrocarbon group having 1 to 20 carbon atoms; p is the valency of the metal; and n is an arbitrary number of 1 to p, and component (b) is a halogeno-compound having the formula:

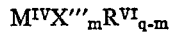

where $M^{IV}$ is a metal of Group IIIb or IVb of the Periodic Table; $X'''$ is a halogen atom; $R^{VI}$ is a hydrocarbon group having 1 to 20 carbon atoms; q is the valency of the metal; and m is an arbitrary number of 1 to q, provided that the metal of at least one of components (a) and (b) is aluminum or boron, provided that components (a) and (b) are different, and provided that catalyst component (a) is contacted with catalyst component (b) in the presence of at least the conjugated compound monomer of Group (B).

8. A process according to claim 7, wherein the organometal halide is an alkylaluminum dihalide, an alkylaluminum sesquihalide, a dialkylaluminum halide, alkylboron dihalide or a dialkylboron halide.

9. A process according to claim 7, wherein said catalyst is used in an amount of from about 0.005 to about 10 moles per mole of said conjugated compound.

10. A process according to claim 7, wherein the halogen-containing metal compound is used in an amount substantially equimolar to the amount of the conjugated monomer.

11. A process according to claim 7, wherein the copolymerization reaction is carried out in a liquid monomer, a hydrocarbon medium or a halogenated hydrocarbon medium.

12. A process for producing an alternating copolymer, which comprises contacting at a temperature of from about $-150°$ C. to about $+100°$ C. monomer (A) and monomer (B) defined in claim 1 with a catalyst comprising component (a) an organo-compound having the formula:

wherein $M'''$ is a metal of Group IIb, IIIb or IVb of Mendeleev's Periodic Table; $R^v$ is a hydrocarbon group having 1 to 20 carbon atoms; n is the valency of the metal, and component (b) a halogeno-compound having the formula:

wherein $M^{IV}$ is a metal of Group IIIb or IVb of the Periodic Table; $X'''$ is a halogen atom; and m is the valency of the metal, provided that the metal of at least one of the components (a) and (b) is aluminum or boron, and provided that the catalyst component (a) is contacted with catalyst component (b) in the presence of at least the conjugated compound monomer of Group B.

13. A process for producing alternating copolymers, which comprises contacting at a temperature of from about $-150°$ C. to about $+100°$ C., in the presence of from about 0.01 to about 5%, based on the conjugated monomer, of oxygen or an organic peroxide, monomer (A) and monomer (B) as defined in claim 1 with a catalyst (1) an organo-metal halide having the formula:

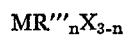

wherein M is aluminum or boron; $R'''$ is a hydrocarbon radical of 1 to 20 carbon atoms; X is a halogen atom; and n is an arbitrary number of from 1 to 2, or with a catalyst (2) comprising component (a) an organo-compound having the formula:

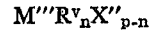

wherein M''' is a metal of Group IIb, IIIb or IVb of Mendeleev's Periodic Table; X'' is a halogen atom; $R^V$ is a hydrocarbon group having 1 to 20 carbon atoms; $p$ is the valency of the metal; and $n$ is an arbitrary number of 1 to $p$, and component (b) a halogeno-compound having the formula:

$$M^{IV}X'''_m R^{VI}_{q-m}$$

where $M^{IV}$ is a metal of Group IIIb or IVb of the Periodic Table; X''' is a halogen atom; $R^{VI}$ is a hydrocarbon group having 1 to 20 carbon atoms; $q$ is the valency of the metal; and $m$ is an arbitrary number of 1 to $q$, provided that the metal of at least one of components (a) and (b) is aluminum or boron, provided that components (a) and (b) are different, and provided that catalyst component (a) is contacted with catalyst component (b) in the presence of at least the conjugated compound monomer of Group B.

References Cited

UNITED STATES PATENTS

| | | | |
|---|---|---|---|
| 3,127,380 | 3/1964 | Welch | 260—85.5 |
| 3,159,607 | 12/1964 | D'Alelio | 260—82.1 |
| 3,169,079 | 2/1965 | Ferrington et al. | 117—124 |
| 3,183,217 | 5/1965 | Serniuk et al. | 260—85.5 |
| 3,326,870 | 6/1967 | Nakaguchi et al. | 260—85.5 |

WILLIAM H. SHORT, Primary Examiner

L. L. LEE, Assistant Examiner

U.S. Cl. X.R.

260—32.6 R, 32.8 R, 63 BA, 63 HA, 73 R, 79.7, 82.1, 82.3, 82.5 85.5 X, 85.5 HC, 85.5 L, 86.1 R, 86.3, 86.7, 88.3 R, 89.7, 94.1